United States Patent [19]

Pine et al.

[11] Patent Number: 5,131,753
[45] Date of Patent: Jul. 21, 1992

[54] ROBOTIC PLACEMENT DEVICE USING COMPLIANT IMAGING SURFACE

[75] Inventors: Jerrold S. Pine, Boca Raton; James C. Robinson, Boynton Beach; David H. Rubin, Wellington, all of Fla.

[73] Assignee: Motorola, Inc., Schaumburg, Ill.

[21] Appl. No.: 565,775

[22] Filed: Jul. 23, 1990

[51] Int. Cl.⁵ .................................... G01B 11/14
[52] U.S. Cl. .......................... 356/375; 356/376; 356/394; 73/104; 73/865.8
[58] Field of Search .......... 356/375, 376, 388, 394, 356/380, 237, 400, 32, 35; 73/104, 800, 865.8

[56] References Cited

U.S. PATENT DOCUMENTS

| | | | |
|---|---|---|---|
| 4,513,613 | 4/1985 | Darves-Bornoz et al. | 73/865.8 |
| 4,558,590 | 12/1985 | Desai et al. | 73/865.8 |
| 4,803,871 | 2/1989 | Harada et al. | 356/376 |

Primary Examiner—Richard A. Rosenberger
Assistant Examiner—Hoa Pham
Attorney, Agent, or Firm—Philip P. Macnak; Vincent B. Ingrassia; William E. Koch

[57] ABSTRACT

An automated component placement device (100) includes an automated robotic transporter (108) that transports a component (106) into an illuminated area (104) on a translucent compliant surface (102) upon which components (104) are placed in a three dimensional orientation such that a silhouette of the components, leads, coplanar or non-coplanar are created on the translucent compliant surface (102) when the translucent compliant surface (102) is flexed. The position of silhouette of the component (106) is used to determine the orientation of the component held by the robotic transporter (108) to facilitate the placement of the component (106).

6 Claims, 1 Drawing Sheet

ROBOTIC PLACEMENT DEVICE USING COMPLIANT IMAGING SURFACE

FIELD OF THE INVENTION

This invention relates in general to automated placement devices, and more specifically to an automated placement devices that employs a silhouette image to determine component placement.

BACKGROUND OF THE INVENTION

With the advent of robotic placement devices, the number of products produced in automated factories have increased many folds within the past decade. This has culminated in most manufacturers and system designers feverishly focusing on further improvements to robotic placement devices to get an advantage in manufacturing efficiency. Typically, manufacturers are faced with the problem of trying to place uniquely-shaped components into areas or apertures with extremely close tolerances. Regrettable, conventional robotic automated placement devices, after securing the component to be placed, must identify its orientation before it can determine a three-dimensional offset to effectuate proper component placement.

One such method currently used involves taking a series of electronic images (pictures) to determine a fixed location from which an offset position may be calculated for the component placement. However, with this method, the more uniquely-shaped components require an extreme number of images to be taken to properly locate the component in a three-dimensional space. Unfortunately, this method requires the use of expensive equipment at a plurality of workstations, which is a very costly alternative. Furthermore, taking several images may involve many rotations (or other movement) of the component to be placed resulting in an unreasonable long delay in determining the component orientation.

Another known method involves rotating the components to produce shadows of the component that are used to determine a three-dimensional orientation. This method eliminates the use of expensive equipment, such as, cameras for providing images. Regrettable, however, a similar number of rotations are required to produce enough different shadow views to properly determine component location, resulting in the approximately the same time delays involved in the previous method.

Thus, what is needed is a automated robotic system that determines a three-dimensional location of a component to be placed quickly and economically.

SUMMARY OF THE INVENTION

Briefly, according to the invention, an automated component placement device comprises an automated transporter for transporting components to be placed. The invention further includes an illuminated area with a translucent compliant surface upon which a component is placed in a three dimensional orientation such that a silhouette of the component is created on the translucent compliant surface when to translucent compliant surface is flexed. The position of the silhouette of the component is used to orient the component to facilitate component placement.

BRIEF DESCRIPTION OF THE DRAWINGS

The drawing Figure is a perspective view of robotic transporter placement device in accordance with the present invention.

DESCRIPTION OF A PREFERRED EMBODIMENT

Figure 1:
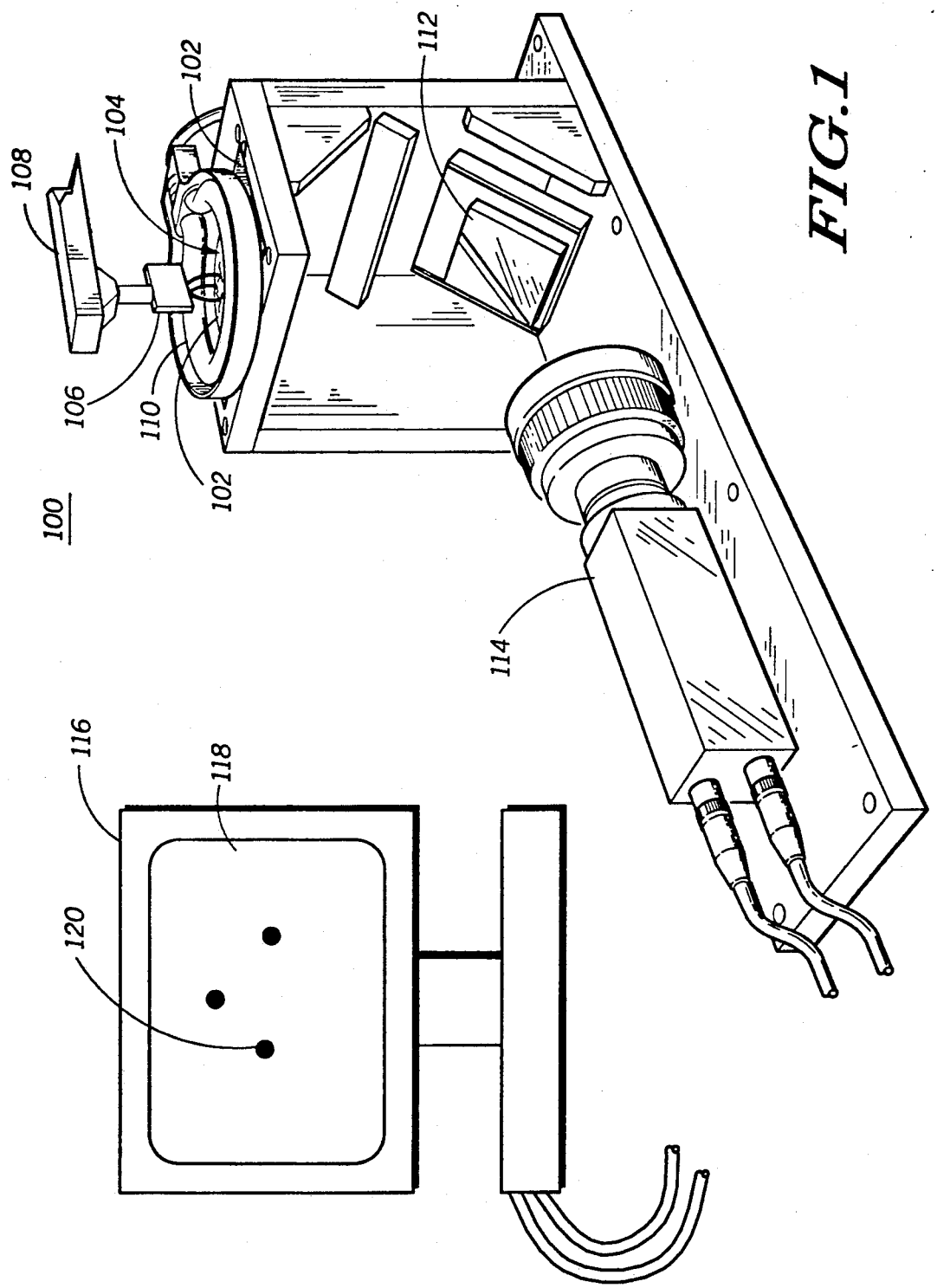

The drawing Figure shows a perspective view of a robotic transporter placement device 100 using a translucent compliant surface 102 to automatically place components during a manufacturing process. According to the invention, the automated component placement device 100 includes a robotic transporter 108 that transports components 106 by picking up the component to be placed via any of the several known techniques. The robotic transporter 108 first transports the component 106 within an illuminated area 104. The illumination is provided by a circular lamp 110, but it can be appreciated that any suitable light source may aptly apply. When the component 106 is placed within the illuminated area 104, it is lowered until at least a portion of the component contacts the translucent compliant surface 102.

Components that have more than one coupling point (e.g., chip holder with unequal length of leads, coplanar or non-coplanar surface), are pressed unto the translucent compliant surface 102 until all leads are in contact with the translucent compliant surface 102. In this way, all the leads may be simply and quickly located, because the translucent compliant surface 102 is flexible yet strong enough to resist being punctured by components 106. When all the "co-planar or non-coplanar surfaces" contacts the translucent compliant surface 102, the illumination source 110 produces a silhouette which is used to determine the component orientation by applying known techniques to the points in the silhouette.

The present invention prefers a conventional latex material of an approximate thickness of three to four thousandths of an inch. However, it can be appreciated that any suitable material may be used.

The silhouette of the component formed on the translucent compliant surface 102 may be reflected by a mirror 112 placed at an appropriate angle to permit a camera 114 to record or provide an electronic image of the silhouette. In can be appreciated that the mirror 112 may be eliminated by directly viewing the compliant translucent surface 102 with the camera 114. This image 118 may be viewed on an appropriate screen 116 by any of the several known imaging techniques. Those skilled in the art will appreciate that the coordinates of the spot 120 on the image 118 displayed on the screen 116 may be calculated, for example, using a computer or a microprocessor. In this way, the determined three-dimensional coordinate points with the appropriate offsets will enable a robot controller 108 to quickly locate and place the component 106 at is intended position (not shown). According to the invention, it can be appreciated that by placing the component onto the translucent compliant surface 102, the three-dimensional coordinates may be determine to effectuate a quick and economical way of placing uniquely-shaped components.

In summary, according to the invention, an automated component placement device having an automated robotic transporter that transports component to be placed. The invention further includes an illuminated area including a translucent compliant surface upon which the components are placed such that a silhouette of the component is formed on the translucent compliant surface. The position of silhouette is used to identify components orientation to facilitate the placement of the component. In this way, coordinates for components to be placed by a robotic transporter are quickly and economically determined. From the coordinates, the final orientation is determined. Subsequent to this procedure, the robotic transporter may continually place uniquely-shaped components from a single silhouette formed upon the translucent compliant surface.

We claim:

1. An automated or semi-automated component placement device, comprising:
   transporting means for transporting a component;
   means for providing an illuminated area;
   a translucent compliant surface within the illuminated area for locating a component in a three-dimensional orientation such that when the component contacts with the translucent compliant surface at least one surface thereto causes the translucent compliant surface to flex producing a silhouette of the component on the translucent compliant surface for use by the transporting means to facilitate a determination of the three dimensional orientation of the component.

2. The automated or semi-automated component placement device according to claim 1 wherein a three dimensional placement position is determined by the transporting means from the silhouette produced by the component on the translucent compliant surface.

3. The automated or semi-automated component placement device according to claim 1 wherein the placement position is determined in three dimensions by using a camera that produces an image which a microcomputer uses to determine the three dimensional orientation of the component to be placed.

4. The automated or semi-automated component placement device according to claim 1 wherein a coplanar component may be placed by pressing components onto the translucent compliant surface causing the translucent compliant surface to flex until a silhouette is formed for determining the three dimensional orientation of the coplanar component.

5. The automated or semi-automated component placement device according to claim 1 wherein a non-coplanar component may be placed by pressing non-components onto the translucent compliant surface causing the translucent compliant surface to flex until a silhouette is formed for determining the three dimensional orientation of the non-coplanar component.

6. An automated or semi-automated component placement device, comprising the steps of:
   (a) transporting a component onto a translucent compliant surface;
   (b) illuminating the translucent compliant surface for providing a silhouette of at least a portion of the component;
   (c) determining a three dimensional orientation of the component by pressing the component on the translucent compliant surface to flex the translucent compliant surface until the three dimensional orientation of the component may be determined from the silhouette.

* * * * *